United States Patent [19]

Gallo

[11] Patent Number: 5,586,410
[45] Date of Patent: Dec. 24, 1996

[54] FRESH FLOWER HOLDER

[76] Inventor: Joseph S. Gallo, 58 Peach St., Walpole, Mass. 02081

[21] Appl. No.: 583,216

[22] Filed: Jan. 4, 1996

[51] Int. Cl.⁶ ........................................ A01G 5/00
[52] U.S. Cl. ................................ 47/55; 428/24
[58] Field of Search ................. 47/55, 41.15; 428/24, 428/25, 26

[56] References Cited

U.S. PATENT DOCUMENTS

| | | | |
|---|---|---|---|
| 2,593,797 | 4/1952 | Robbins | 47/55 |
| 3,150,462 | 9/1964 | Gallo | 47/55 |
| 3,318,044 | 5/1967 | Kise | 47/55 |
| 3,321,866 | 5/1967 | Gallo | 47/55 |
| 3,553,889 | 1/1971 | Gallo | 47/55 |
| 3,597,879 | 8/1971 | Gallo | 47/55 |
| 4,281,474 | 8/1981 | Gallo | 47/58 |
| 4,291,496 | 9/1981 | Click | 47/55 |
| 4,403,446 | 9/1983 | Wolfe et al. | 47/58 |
| 4,481,732 | 11/1984 | Gallo | 47/55 |

FOREIGN PATENT DOCUMENTS

| | | | |
|---|---|---|---|
| 922107 | 3/1973 | Canada | 47/20 |

*Primary Examiner*—Henry E. Raduazo
*Attorney, Agent, or Firm*—Fish & Richardson P.C.

[57] ABSTRACT

A holder for at least one element of living corsage material from which substantially the entire stem has been severed. The holder comprises a covered wire; a plug of absorbent material surrounding an intermediate portion of the covered wire to form a moisture reservoir, the plug having upper and lower surfaces through which the covered wire passes and sides extending from the upper to the lower surfaces; and a water-repellent covering surrounding the sides and lower surface of the plug and extending down the wire, and leaving the upper surface of the plug uncovered; the plug of absorbent material comprises random fibers of synthetic material organized generally uniformly in density throughout the plug and extending predominantly parallel to the covered wire, the fibers being capable of spreading generally radially outwardly to permit insertion of the severed end of the living material into the plug and being capable of providing a radially-inward restoring tendency to keep the material from breaking its moisture-supplying contact with the plug, the wire having a laterally-extending formation at the intermediate portion, the formation extending laterally from the wire into the fibers of the plug to secure the plug to the wire.

17 Claims, 2 Drawing Sheets

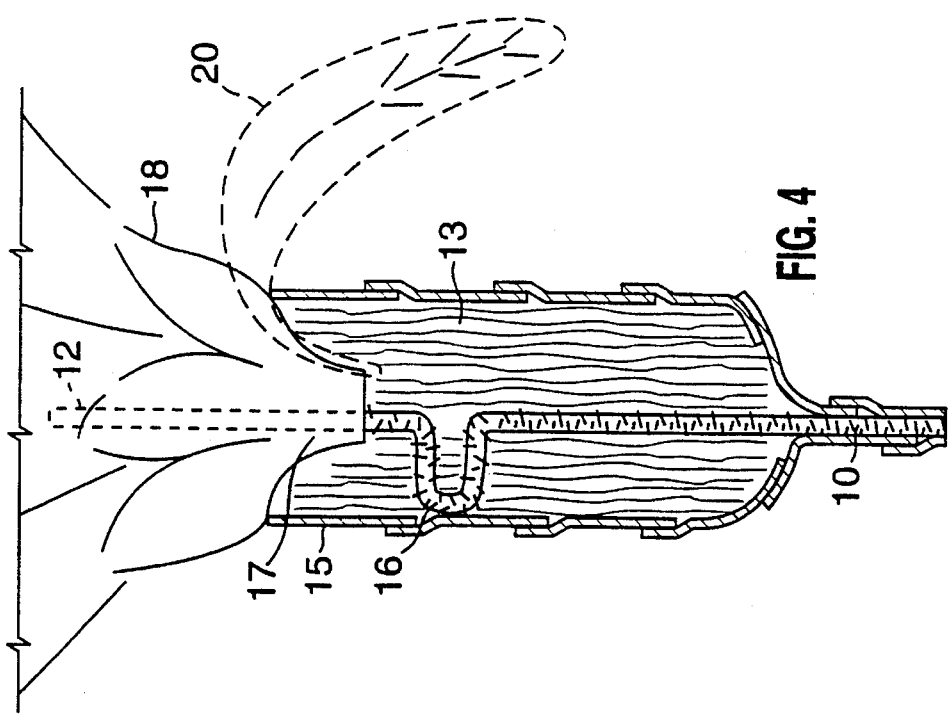
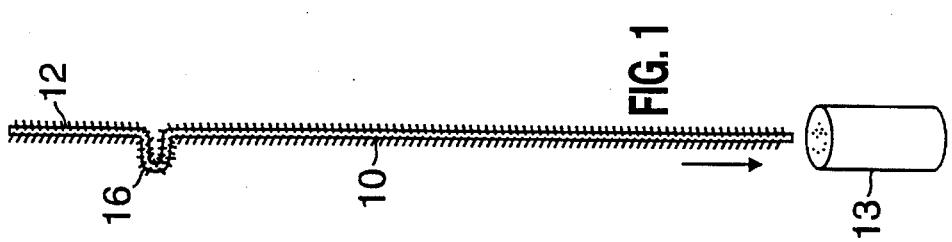

FRESH FLOWER HOLDER

FIELD OF THE INVENTION

This invention relates to holders for fresh flowers.

BACKGROUND OF THE INVENTION

Corsages are often made by impaling the severed end of a fresh flower with a wire holder. To keep the flower fresh for an extended period, it is known to add a moisture reservoir to the holder. My U.S. Pat. Nos. 3,150,462, 4,281,474, 4,481,732 (all hereby incorporated by reference) describe holders with such moisture reservoirs; a moisture absorbent material surrounds a textile-covered stem and is covered by an outer coating of water-repellent adhesive tape.

The flower holder described in my U.S. Pat. No. 4,481,732 has been in widespread use in the United States for roughly ten years. It has a moisture reservoir made from a plug of fibers, in which the fibers extend predominantly parallel to the covered wire. Early in the manufacture and use of this holder, it was discovered that the fiber plug tended to slip relative to the wire extending through it. The lengthwise orientation of the fibers that aided insertion of the severed end of the flower also allowed the wire to slip through the fiber plug. Tape surrounding the plug and wire resisted the movement, but not sufficiently to keep the plug firmly in contact with the severed end of the flower. The solution implemented was to glue the wire to the fiber plug, by dipping the wire in glue before inserting it into the base of the fiber plug.

But this glued construction suffers from several problems. The glue is drawn into the pores of the fiber plug, substantially lowering the plug's water holding capacity; most of the glue resides at the lower end of the plug, but some finds its way to the exposed end of the fiber plug, and interferes there with moisture transfer between the plug and the impaled end of the flower. Glue also remains on the textile material covering the wire impaled by the flower, making the wire less effective in transferring moisture to the flower. Typically, a flocked wire is used, and the glue fills the tiny spaces between the flocking, impairing its ability to transfer water and to hold the impaled flower.

SUMMARY OF THE INVENTION

I have discovered a simple, inexpensive way of securing the absorbent plug to the wire in a flower holder. A laterally-extending formation (e.g., a U-shaped bend) in the wire is embedded in the absorbent plug. Surprisingly, the formation is capable of securing the plug to the wire without the use of glue. Enough resistance to insertion of the wire is provided to handle the loading that occurs during the step of impaling the severed flower onto the wire. All of the difficulties brought on by the use of glue in prior holders can be avoided.

An equally surprising outcome is that a pocket for receiving the severed end of the flower is formed on the upper surface of the absorbent plug in the process of embedding the lateral formation into the plug. By allowing the severed end of the flower to penetrate into the absorbent plug, the pocket significantly improves moisture transfer to the flower. Moisture transfer from the plug to the flower is not interrupted by a slight movement of the flower away from the moisture reservoir, because contact is maintained between the severed end of the flower and the plug even after such a slight movement has occurred.

The invention features a holder for at least one element of living corsage material from which substantially the entire stem has been severed. The holder comprises a covered wire; a plug of absorbent material surrounding an intermediate portion of the covered wire to form a moisture reservoir, the plug having upper and lower surfaces through which the covered wire passes and sides extending from the upper to the lower surfaces; and a water-repellent covering surrounding the sides and lower surface of the plug and extending down the wire, and leaving the upper surface of the plug uncovered; the plug of absorbent material comprises random fibers of synthetic material organized generally uniformly in density throughout the plug and extending predominantly parallel to the covered wire, the fibers being capable of spreading generally radially outwardly to permit insertion of the severed end of the living material into the plug and being capable of providing a radially-inward restoring tendency to keep the material from breaking its moisture-supplying contact with the plug, the wire having a laterally-extending formation at the intermediate portion, the formation extending laterally from the wire into the fibers of the plug to secure the plug to the wire.

In preferred embodiments, the invention may have one or more further features: The laterally-extending formation may be formed from a bent section of the wire. The plug may be cylindrical. The lateral formation may have a lateral extent of at least ⅓ of the diameter of the plug. The fibers may be capable of being spread transversely at a location spaced from the wire to permit insertion and retention of a second element of living corsage material such as a piece of foliage. The water-repellent covering may comprise an adhesive tape wound around the outer surface of the plug of absorbent material and around a portion of the wire below the plug. The fibers may be crinkled in shape so as to form many small water-retaining cavities between fibers and thereby provide radial resilience which permits the fibers to spread radially outward from the center of the plug when the severed end of the corsage material is inserted at the center and which gives the fibers a radially-inward restoring tendency that grips the inserted end of the flower to keep the flower from breaking its moisture-supplying contact with the plug. The covered wire may be a flocked wire or a textile-covered, millinery wire (preferably doubled-over at the end impaled on the severed end of the flower; the doubled over portion extends only so far down the holder as to enter the moisture reservoir but not far enough to extend beyond the reservoir, thereby leaving a single wire for use in attaching the holder).

The lateral formation may be U-shaped, with a lower section furthest from the upper surface of the plug joined at a bend of wire to an upper section closest to the upper surface of the plug. The lower section of the U-shaped, lateral formation preferably extends perpendicularly to the wire over the majority of its extent. The lower section preferably joins the wire at approximately a 90 degree bend, and the two sections meet at an approximately 180 degree bend of the wire. A plurality of lateral formations may be formed on the wire.

The invention also has the advantage of permitting a separate piece of living material (e.g., foliage) to be inserted into and held by the fibrous plug, in addition to the severed end of the flower. Use of the fibrous plug prevents the flower end of the plug from being accidentally closed by improper adhesive tape installation, as could happen with the holder of my U.S. Pat. No. 4,281,474. Permitting the moisture-absorbing plug to be simply slid onto the wire saves manufacturing expense over constructions in which the absorbent material is wrapped onto the wire.

The invention has numerous advantages: By securing the absorbent plug to the wire without the need for glue, manufacturing costs are reduced (e.g., the cost and complexity of gluing are avoided); moisture capacity of the absorbent plug is increased (volume lost as a consequence of glue filling pores in the plug is eliminated); and moisture transfer to the cut flower is improved (glue residue on the wire flocking and on the upper surface of the absorbent plug are eliminated). By inserting the wire into the upper surface of the absorbent plug, better centering of the wire is achieved; when the wire is inserted into the bottom of the plug, it can go in at an angle, resulting in it emerging at one side of the upper surface, with resulting degradation in the contact with the severed end of the flower. A pocket for receiving the severed end of the flower is formed in the upper surface of the plug as a consequence of embedding the lateral formation, and that pocket improves moisture transfer to the flower.

Other advantages and features of the invention will be apparent from the following description of the preferred embodiments thereof, and from the claims.

DESCRIPTION OF THE PREFERRED EMBODIMENT

FIG. 1 is a perspective view illustrating the first step in the manufacture of the flower holder in which a stiff wire 10 of small gauge, which has been flocked, is bent to form a laterally-extending formation 16 at its upper end 12, and inserted (lower end of wire first) into a plug 13 of absorbent fibers.

FIG. 2 is a perspective view illustrating a further step in the manufacture, after the lower end of the wire has been inserted through the upper surface of the plug of absorbent fibers, and the plug has been moved upwardly along the wire until the laterally-extending formation is embedded within the plug.

FIG. 3 is a perspective view of the holder with an outer water-repellent wrapping 15 added.

FIG. 4 is an enlarged sectional view of the absorbent plug end of the holder with the base of a flower in place.

FIG. 5 is a perspective view of the wire of an alternative embodiment, in which a length of stiff millinery wire (i.e., wire wound with a textile covering), bent double at its upper end, substitutes for the flocked wire of FIGS. 1–4.

Figure 10:
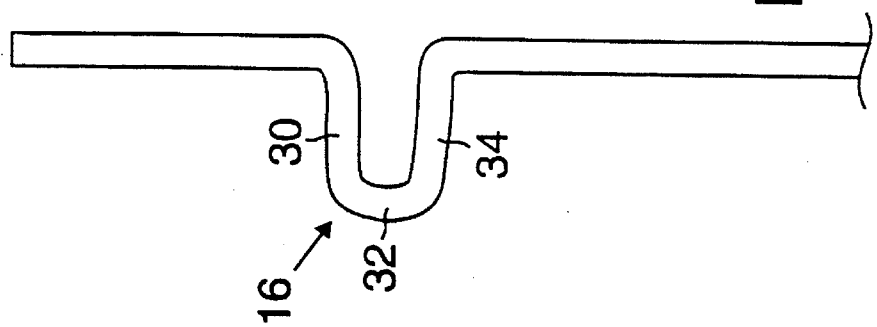
FIG. 10 is an enlarged view of a laterally-extending wire formation.

The flower or bud holder illustrated in the drawings includes a length of flocked wire 10, an absorbent plug 13 of acetate fibers surrounding the upper end 12 of the wire, and a water repellent adhesive tape 15 wound around plug 13 and down the length of wire 10.

Plug 13 is roughly 0.25 inches in diameter and 0.875 inches in length and consists of non-woven acetate fibers which extend predominantly lengthwise within the plug but which are also crinkled in shape rather than straight (a thin paper cover, not shown in the drawings, surrounds plug 13). This crinkled shape, which gives the fibers many short bends or turns, provides small internal cavities within the plug for storing moisture and provides radial resilience for gripping the severed end of a flower impaled on the holder. The plug can be cut to a desired length from longer rods of such fibers.

Adhesive tape 15 is wound so that it extends to the edge of or just beyond the flower end of plug 13 so as to hide the plug from view when a flower is installed. The tape provides a water-tight cover for plug 13 and also helps bind together the plug and wire.

Laterally-extending formation 16 provides the primary means of securing plug 13 to wire 10. As shown in FIG. 10, the formation has a upper section 30, mid section 32, and lower section 34. Preferably, the lower section extends substantially perpendicularly to the length of wire 10, to provide the maximum resistance to movement of the wire when formation 16 is embedded in plug 13.

The holder is assembled, as shown in FIG. 1, by inserting the lower end of wire 10 into the center of plug 13, and pulling the wire through the plug until the laterally-extending formation is embedded within the plug. The formation extends laterally (dimension L from centerline of wire, FIG. 8) by approximately 50% of the diameter (dimension D, FIG. 8) of plug 13. Preferably, this lateral dimension of the formation is at least ⅓ of the diameter of the plug.

Because the wire is inserted lower end first into the upper surface of the plug, it is straightforward for the assembler to produce a finished holder in which the upper end 12 of the wire is centrally positioned in the upper surface of the plug.

Embedding formation 16 into the plug secures the plug to the wire. Under ordinary loads, the plug will remain fixed in position on the wire. Only by applying a load larger than would be applied during use (e.g., when impaling a flower on wire end 12), can the plug be moved relative to the wire.

Figure 8:
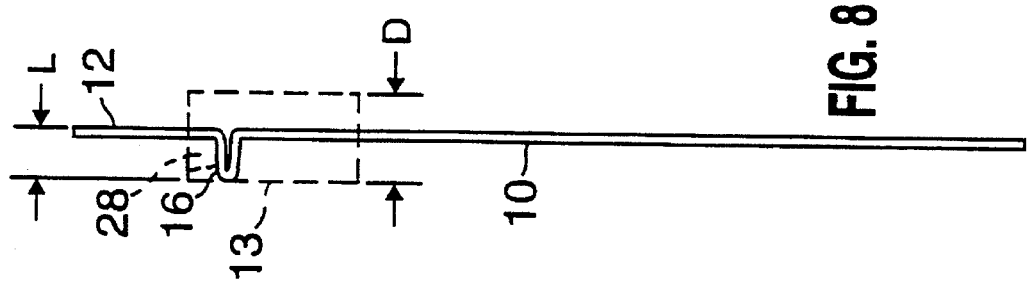
Figure 7:
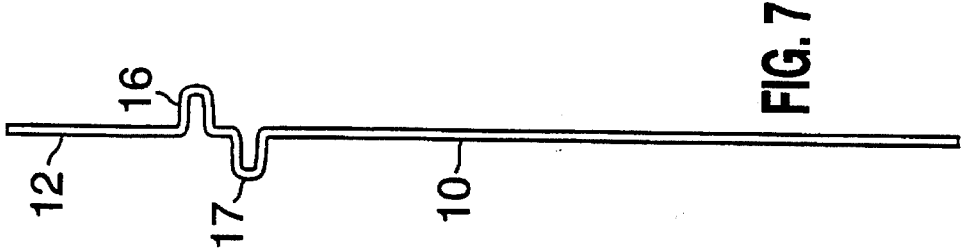
Figure 6:
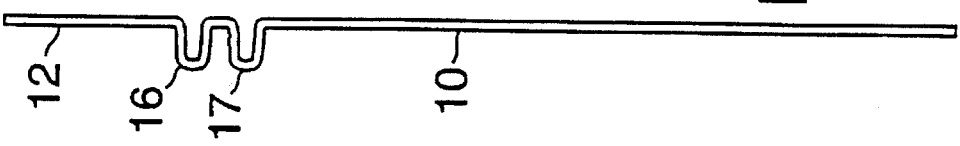

Embedding the lateral formation into the plug has the surprising further advantage of creating a pocket 28 for receiving the severed end of the flower (FIGS. 2, 3, and 8). The pocket tends to be slightly off center, owing to the off center location of the formation, but functions very well as an entry point for embedding the severed end of the flower into the absorbent plug, and thereby improving moisture transfer to the flower. (After the flower is inserted, the pocket is typically not visible, and thus is not shown in the enlarged view of FIG. 4.)

Other covered wires can be used, e.g., millinery wire, as shown in FIG. 5. Such wire is bent over double at the upper end. The doubled-end extends into but not beyond the moisture reservoir, thereby leaving only a single thickness of wire extending below the moisture reservoir. A single thickness is preferred because it is more easily bent when attaching the corsage. The bent-double end 12 passes easily through plug 13; because of the bent-double configuration, there is no tendency for the textile wrapping to come off when the wire is passed through the plug.

Figure 9:
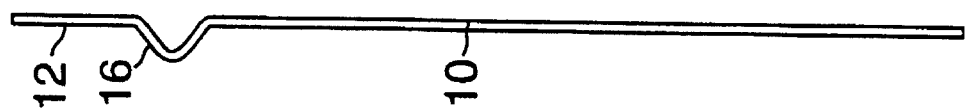
FIGS. 6–9 are perspective views of alternative laterally-extending wire formations.

There are a great many possible variations in the shape of the laterally-extending formation. A few possibilities are shown in FIGS. 6–9. More than one formation could be provided, either on the same side of the wire (FIG. 6) or on the opposite side (FIG. 7), or elsewhere (not shown). The formation could have less longitudinal extent, i.e., a shorter midsection 32 (FIG. 8). Although it is preferred that the lower section 34 be substantially perpendicular to the wire, that section, and the upper section 30, could be angled with respect to the wire (FIG. 9).

When a flower or bud 18 is impaled on end 12 of wire 10, the base or severed end 17 of the flower is inserted a small distance into plug 13, being guided in such entry by pocket 28 formed by embedding formation 16. The lengthwise orientation and the crinkled shape of the fibers give the fibers a radial or transverse resilience which permits the fibers to spread radially outward from the center of the plug when the severed end of the flower is inserted at the center and which gives the fibers a radially-inward restoring tendency that grips the inserted end of the flower to keep the flower from breaking its moisture-supplying contact with the plug. Because the base of the flower has been inserted a small distance into the plug, some separating movement can be tolerated without breaking that contact.

Prior to use the holder is immersed in water until plug 13 is saturated. In order to impale the flower 18 upon bent-double end 12 and insert it into plug 13, the holder is grasped firmly at a point immediately below the base of plug 13 and the bent end 12 is forced into the severed end 17 of the flower and up into the flower. The ability of the fibers of plug 13 to spread transversely also permits insertion of a piece of foliage 20 to enhance the appearance of the corsage.

It is in this impaling step that formation 16 must securely hold the absorbent plug to the wire. With the plug held in one hand, the severed end of the flower forced downward by the other hand, the wire is forced downwardly, and would move relative to the plug if not secured. The laterally-extending formation, and preferably the perpendicularly-extending lower section thereof, impedes movement of the wire during this impaling operation.

Other embodiments of the invention are within the following claims. For example, some of the advantages of the invention could be had if the lateral formation were combined with glue for securing the absorbent plug to the wire.

What is claimed is:

1. A holder for at least one element of living corsage material from which substantially the entire stem has been severed, the holder comprising a covered wire;

a plug of absorbent material surrounding an intermediate portion of the covered wire to form a moisture reservoir, the plug having upper and lower surfaces through which the covered wire passes and sides extending from the upper to the lower surfaces; and a water-repellent covering surrounding the sides and lower surface of the plug and extending down the wire, and leaving the upper surface of the plug uncovered;

the plug of absorbent material comprising random fibers of synthetic material organized generally uniformly in density throughout the plug and extending predominantly parallel to the covered wire, the fibers being capable of spreading generally radially outwardly to permit insertion of the severed end of the living material into the plug and being capable of providing a radially-inward restoring tendency to keep the material from breaking its moisture-supplying contact with the plug, the wire having a laterally-extending formation at the intermediate portion, the formation extending laterally from the wire into the fibers of the plug to secure the plug to the wire.

2. The holder of claim 1 wherein the laterally-extending formation is a bent section of the wire.

3. The holder of claim 2 wherein a pocket for receiving the severed end of the living material is formed in the upper surface of the plug of fibers by insertion of the wire through the upper surface of the plug so that the lateral formation is embedded into the plug of fibers.

4. The holder of claim 3 wherein the plug is cylindrical with a diameter.

5. The holder of claim 4 wherein the lateral formation has a lateral extent of at least ⅓ of the diameter.

6. The holder of claim 5 wherein there is only a single lateral formation embedded in the plug of fibers.

7. The holder of claim 6 wherein the fibers are capable of being spread transversely at a location spaced from the wire to permit insertion and retention of a second element of living corsage material such as a piece of foliage.

8. The holder of claim 5 wherein the water-repellent covering comprises an adhesive tape wound around the outer surface of the plug of absorbent material and around a portion of the wire below the plug.

9. The holder of claim 5 wherein the fibers are crinkled in shape so as to form many small water-retaining cavities between fibers and thereby provide radial resilience which permits the fibers to spread radially outward from the center of the plug when the severed end of the corsage material is inserted at the center and which gives the fibers a radially-inward restoring tendency that grips the inserted end of the flower to keep the flower from breaking its moisture-supplying contact with the plug.

10. The holder of claim 5 wherein the covered wire comprises a flocked wire.

11. The holder of claim 5 wherein the covered wire comprises a textile covered wire, the textile covered wire is bent over at the end of which the corsage material is to be impaled.

12. The holder of claim 11 wherein the length of the doubled over portion of the textile-covered wire extends only so far down the holder as to enter the moisture reservoir but not far enough to extend beyond the reservoir, thereby leaving a single wire for use in attaching the holder.

13. The holder of claim 12 wherein the textile-covered wire extends in one piece the full length of the holder.

14. The holder of claim 1 wherein the lateral formation is U-shaped, comprising a lower section furthest from the upper surface of the plug joined at a bend of wire to an upper section closest to the upper surface of the plug.

15. The holder of claim 14 wherein the lower section of the U-shaped lateral formation extends perpendicularly to the wire over the majority of its extent.

16. The holder of claim 15 wherein the upper and lower sections of the U-shaped, lateral formation extend perpendicularly to the wire over the majority of their extent, the two sections join the wire at approximately 90 degree bends, and the two sections meet at an approximately 180 degree bend of the wire.

17. The holder of claim 5 wherein a plurality of laterally-extending formations on the wire are embedded in the absorbent plug.

* * * * *